(12) United States Patent
Liao et al.

(10) Patent No.: US 11,694,337 B1
(45) Date of Patent: Jul. 4, 2023

(54) PROCESSING PATH GENERATING METHOD AND DEVICE

(71) Applicant: Industrial Technology Research Institute, Hsinchu (TW)

(72) Inventors: Meng-Chiou Liao, Yunlin County (TW); Chang-Lin Wang, Changhua County (TW); Chin-Ming Chen, Taichung (TW); Chien-Yi Lee, Taichung (TW); Po-Hsun Wu, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/710,684

(22) Filed: Mar. 31, 2022

(30) Foreign Application Priority Data

Feb. 9, 2022 (TW) ................................. 111104723

(51) Int. Cl.
*G06T 7/13* (2017.01)
*G06T 7/174* (2017.01)
*G06T 7/55* (2017.01)
*H04N 23/695* (2023.01)

(52) U.S. Cl.
CPC ............... *G06T 7/13* (2017.01); *G06T 7/174* (2017.01); *G06T 7/55* (2017.01); *H04N 23/695* (2023.01); *G06T 2207/30164* (2013.01)

(58) Field of Classification Search
CPC .. G06T 7/13; G06T 7/174; G06T 7/55; G06T 2207/30164; H04N 5/23299; H04N 23/695

USPC ........................................................ 348/86
See application file for complete search history.

(56) References Cited

U.S. PATENT DOCUMENTS

| 8,995,749 | B2 | 3/2015 | Bryll |
| 10,295,341 | B2 | 5/2019 | Garvey et al. |
| 2011/0282492 | A1 | 11/2011 | Krause et al. |
| 2012/0242827 | A1 | 9/2012 | Chang et al. |
| 2013/0203320 | A1 | 8/2013 | Ghalambor |
| 2017/0003113 | A1* | 1/2017 | Pettersson ............ G01B 21/047 |

(Continued)

FOREIGN PATENT DOCUMENTS

| CN | 207522229 U | 6/2018 |
| CN | 110788684 A | 2/2020 |

(Continued)

OTHER PUBLICATIONS

Taiwan Patent Office, Office Action, Patent Application Serial No. 111104723, Mar. 2, 2023, Taiwan.

*Primary Examiner* — Christopher S Kelley
*Assistant Examiner* — Ana Picon-Feliciano

(57) ABSTRACT

A processing path generating method includes the following steps. An image-capturing device is moved to the first position of the region of interest to perform an image-capture on a workpiece, so as to obtain a first image. The image-capturing device is moved to a second position to perform the image-capture on the workpiece, so as to obtain a second image. A first edge characteristic and a second edge characteristic of the workpiece are obtained according to the first image and the second image. Three-dimensional edge information of the workpiece is fitted according to the first edge characteristic and the second edge characteristic. A processing path is generated according to the three-dimensional edge information.

8 Claims, 5 Drawing Sheets

(56) References Cited

U.S. PATENT DOCUMENTS

| | | |
|---|---|---|
| 2019/0130638 A1 | 5/2019 | Bridges |
| 2020/0043183 A1 | 2/2020 | Haverkamp et al. |
| 2021/0034032 A1* | 2/2021 | Hebenstreit ........ B23Q 17/2428 |

FOREIGN PATENT DOCUMENTS

| | | |
|---|---|---|
| CN | 111366123 A | 7/2020 |
| EP | 2236978 | 10/2010 |
| TW | 201518887 | 5/2015 |
| TW | I725630 | 4/2021 |

* cited by examiner

PROCESSING PATH GENERATING METHOD AND DEVICE

CROSS REFERENCE TO RELATED APPLICATIONS

This application claims priority of Taiwan Patent Application No. 111104723, filed on Feb. 9, 2022, the entirety of which is incorporated by reference herein.

TECHNICAL FIELD

The present disclosure relates to a processing path generating method and device.

BACKGROUND

Generally, after a computer numerical control (CNC) machine tool processes a workpiece, some product lines need to set up an additional manual deburring workstation to further process the burr on the workpiece after processing. For example, the form tolerance in a lost wax casting workpiece may reach 2 mm. However, for mass-produced high-precision CNC machine tool, it is impossible to flexibly correct a variation in a single workpiece. Accordingly, the deburring process must be manually performed after the workpiece has been processed, which incurs a cost in terms of labor and time, especially when working with hard materials, as the quality is more difficult to control.

Therefore, how to effectively generate the edge processing path of a workpiece to improve the flexibility of machine processing and increase the convenience of use has become a focus for technical improvements by various manufacturers.

SUMMARY

The present disclosure provides a processing path generating method, which includes the following steps. An image-capturing device is moved to the first position of the region of interest to perform an image-capture on a workpiece, so as to obtain a first image. The image-capturing device is moved to a second position to perform the image-capture on the workpiece, so as to obtain a second image. The first edge characteristic and the second edge characteristic of the workpiece are obtained according to the first image and the second image. Three-dimensional edge information of the workpiece is fitted according to the first edge characteristic and the second edge characteristic. A processing path is generated according to the three-dimensional edge information.

The present disclosure provides a processing path generating device, which includes an image-capturing device and a processing device. The image-capturing device is disposed on a processing machine. The processing device is configured to control the processing machine to move the image-capturing device to a first position of a region of interest to perform an image-capture on a workpiece, so as to obtain a first image, and to move the image-capturing device to a second position to perform the image-capture on the workpiece, so as to obtain a second image. The processing device obtains a first edge characteristic and a second edge characteristic of the workpiece according to the first image and the second image, fits three-dimensional edge information of the workpiece according to the first edge characteristic and the second edge characteristic, and generates a processing path according to the three-dimensional edge information.

BRIEF DESCRIPTION OF DRAWINGS

The present disclosure can be more fully understood by reading the subsequent detailed description and examples with references made to the accompanying drawings, wherein.

DETAILED DESCRIPTION OF DISCLOSED EMBODIMENTS

Technical terms of the present disclosure are based on general definition in the technical field of the present disclosure. If the present disclosure describes or explains one or some terms, definition of the terms is based on the description or explanation of the present disclosure. Each of the disclosed embodiments has one or more technical features. In possible implementation, a person skilled in the art would selectively implement all or some technical features of any embodiment of the present disclosure or selectively combine all or some technical features of the embodiments of the present disclosure.

In each of the following embodiments, the same reference number represents the same or a similar element or component.

Figure 1:
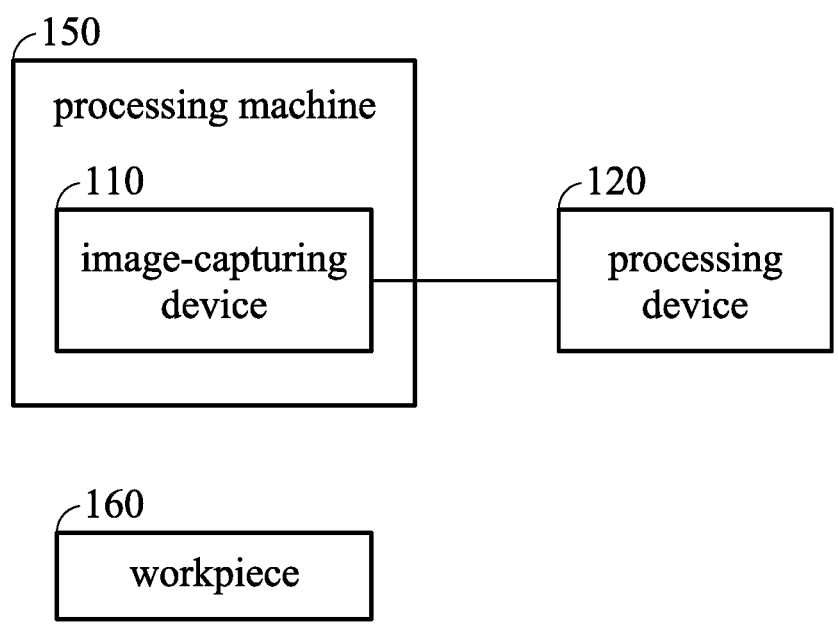
FIG. 1 is a schematic view of a processing path generating device according to an embodiment of the present disclosure.

FIG. 1 is a schematic view of a processing path generating device according to an embodiment of the present disclosure. Please refer to FIG. 1. The processing path generating device 100 may include an image-capturing device 110 and a processing device 120.

The image-capturing device 110 may be disposed on a processing machine 150. Furthermore, the image-capturing device 110 may be disposed on a spindle of the processing machine 150. In some embodiments, the image-capturing device 110 may include an image-capturing lens and an image-capturing unit, or a charge coupled device (CCD), but the embodiment of the present disclosure is not limited thereto. In addition, the processing machine 150 may be a CNC machine tool or another type of machine tool, but the embodiment of the present disclosure is not limited thereto.

The processing device 120 is coupled to the image-capturing device 110. The processing device 120 may control the processing machine 150 to move the image-capturing device 110 to a first position of a region of interest (ROI) to perform an image-capture on a workpiece 160, so as to obtain a first image. In the embodiment, the region of interest may include a square, a circle, an ellipse, or an irregular polygon, but the embodiment of the present disclosure is not limited thereto. For example, the shape of the region of interest may be adjusted according to the appearance of the workpiece. In addition, the region of interest may also correspond to a coordinate value. Furthermore, the shape of the region of interest and the corresponding coordinate value thereof may be set and adjusted by the user according to the appearance and shape of the workpiece 160. The shape of the region of interest and the corresponding coordinate value thereof may be stored in the storage device (such as a memory, a hard disk, etc.) of the processing device 120 in advance.

Then, the processing device 120 may control the processing machine 150 to move the image-capturing device 110 to a second position to perform the image-capture on the workpiece 160, so as to obtain a second image. In the embodiment, the processing machine 150 may move the image-capturing device 110 from the first position to the second position in a horizontal direction. For example, the horizontal direction may include an X-axis and a Y-axis. In some embodiments, the processing machine 150 may move the image-capturing device 110 from the first position to the second position on the X-axis. In some embodiments, the processing machine 150 may move the image-capturing device 110 from the first position to the second position on the Y-axis. In some embodiments, the processing machine 150 may move the image-capturing device 110 from the first position to the second position on the X-axis and the Y-axis.

After the processing device 120 obtains the first image and the second image of the workpiece 160, the processing device 120 may obtain a first edge characteristic and a second edge characteristic of the workpiece 160 according to the first image and the second image. That is, the processing device 120 may analyze and process the first image and the second image corresponding to the region of interest without analyzing and processing the entire images of the first image and the second image, so as to obtain the first edge characteristic and the second edge characteristic of the workpiece 160. Therefore, the speed of obtaining the first edge characteristic and the second edge characteristic of the workpiece 160 may be accelerated.

Then, the processing device 120 may fit three-dimensional edge information of the workpiece 160 according to the first edge characteristic and the second edge characteristic. For example, the processing device 120 may calculate the offset between the first edge characteristic and the second edge characteristic to obtain the depth difference (such as Z-axis information) between the first edge characteristic and the second edge characteristic, and then fit the three-dimensional edge information of the workpiece 160. Afterward, the processing device 120 may generate a processing path according to the aforementioned three-dimensional edge information. That is, the processing device 120 may convert the three-dimensional edge information into a processing path through a three-dimensional coordinate axis, such that the processing device 120 may control the processing machine 150 to perform subsequent processing on the workpiece 160 according to the processing path, for example, the processing machine 150 cuts burrs on the edge of the workpiece 160. Therefore, the processing machine 150 of the embodiment does not need to be changed and recalibrated after processing, and directly generates the processing path suitable for the respective workpieces 160 through the image-capturing device 110 and the processing device 120, so as to increase the convenience of use.

In the embodiment, the processing device 120 may include a micro control unit (MCU) or a micro-processor, but the embodiment of the present disclosure. In addition, the image-capturing device 110 and the processing device 120 may be separately disposed, i.e., the processing device 120 is not disposed on the processing machine 150, as shown in FIG. 1, but the embodiment of the present invention is not limited thereto. In some embodiments, the image-capturing device 110 and the processing device 120 may be disposed on the processing machine 150.

Furthermore, after the processing device 120 obtains the first edge characteristic and the second edge characteristic corresponding to the workpiece 160, the processing device 120 may perform an edge point gradient operation on the first edge characteristic and the second edge characteristic, so as to determine a plurality of edge characteristic points of the workpiece 160. In the embodiment, the aforementioned edge point gradient operation may be a Soble operator, but the embodiment of the present disclosure is not limited thereto.

That is, the processing device 120 may use the gradient vector of the image corresponding to the first edge characteristic and the second edge characteristic as the edge determination basis, and use separate matric masks to detect for the edges with different directions (i.e., the X-axis direction and the Y-axis direction). When the gradient vector of the image changes over a threshold, the processing device 120 may determine that the image is an edge of the workpiece 160, and generate an edge characteristic point of the workpiece 160 accordingly.

Then, the processing device 120 may perform a characteristic point screening on the aforementioned edge characteristic points, so as to obtain a plurality of discrete characteristic points. Furthermore, the processing device 120 uses, for example, a labeling method to perform the characteristic screening on the aforementioned edge characteristic points, so as to obtain the aforementioned discrete characteristic points.

For example, the processing device 120 may cut the image corresponding to the aforementioned edge characteristic points into a plurality of blocks, assign a label to each of the blocks, and labels all adjacent blocks as the same label. Then, the processing device 120 may determine the number of edge characteristic points of the block corresponding to each of the label. If the number of edge characteristic points of the block corresponding to a certain label is lower a predetermined number (i.e., the number of the edge characteristic points is too few), the processing device 120 may determine that the edge characteristic points of the block corresponding to the aforementioned label are noises, and clear the characteristic points of the block corresponding to the aforementioned label. If the number of the edge characteristic points of the block corresponding to a certain label is greater than or equal to the predetermined number, the processing device 120 may output the aforementioned edge characteristic points as the discrete characteristic points.

Then, the processing device 120 may calculate the aforementioned discrete characteristic points to generate discrete information of the workpiece 160. Furthermore, after the processing device 120 obtains the aforementioned discrete characteristic points, the processing device 120 may select two discrete characteristic points from among the aforementioned discrete characteristic points. Then, the processing device 120 may calculate the distance between the two discrete characteristic points, so as to determine whether the distance between the two discrete characteristic points is relatively small or relatively large. Afterward, the processing device 120 may determine whether the aforementioned distance is greater than a predetermined distance.

When it is determined that the aforementioned distance is not greater than the predetermined distance, it indicates that the distance between the two aforementioned discrete characteristic points is relatively small, and the processing device 120 may directly output the two discrete characteristic points. When it is determined that the aforementioned distance is greater than the predetermined distance, it indicates that the distance between the two aforementioned discrete characteristic points is relatively large, and the processing device 120 may calculate the curvature of the two discrete characteristic points, so as to determine whether the connecting line between the two aforementioned discrete characteristic points is a straight line or an arc line.

Then, the processing device 120 may determine whether the curvature is less than a predetermined curvature. When it is determined that the curvature is not less than the predetermined curvature, it indicates that the connecting line between the two aforementioned discrete characteristic points is the straight line, and the processing device 120 may perform a straight line complement point operation between the two discrete characteristic points to generate a plurality of first complement points, and output the aforementioned first complement points and the two aforementioned discrete characteristic points as a basis for subsequent connection.

When it is determined that the curvature is less than the predetermined curvature, it indicates that the connecting line between the two aforementioned discrete characteristic points is the arc line, and the processing device 120 may perform an arc line complement point operation between the two discrete characteristic points according to the curvature to generate a plurality of second complement points, and output the aforementioned second complement points and the two aforementioned discrete characteristic points as a basis for subsequent connection. In some embodiments, the processing device 120 uses, for example, a least square method to perform an arc line complement point operation between the two discrete characteristic points according to the curvature to generate the second complement points.

Then, the processing device 120 may determine whether all of the discrete characteristic points have been selected. When it is determined that all of the discrete characteristic points have not been selected, the processing device 120 may continue to select two discrete characteristic points from among the aforementioned discrete characteristic points. That is, two new discrete characteristic points are selected, and the aforementioned operations are performed on the two new discrete characteristic points, so as to process all of the discrete characteristic points.

When it is determined that all of the discrete characteristic points have been selected, the processing device 120 may generate the edge information of the workpiece 160 according to the aforementioned discrete characteristic points, the aforementioned first complement points and the aforementioned second complement points. For example, the processing device 120 may connect the aforementioned discrete characteristic points, the aforementioned first complement points and the aforementioned second complement points to generate the edge contour of the workpiece 160 as the edge information of the workpiece 160. Therefore, the accuracy of the edge information of the workpiece 160 may be increased by generating the first complement points and the second complement points.

Then, the processing device 120 may obtain depth information of the workpiece 160 according to the first edge characteristic and the second edge characteristic. For example, assuming that the depth of the first edge characteristic point of the first edge characteristic is the same as the depth of the second edge characteristic point of the second edge characteristic, the relative positions of the first edge characteristic point and the second edge characteristic point obtained after the image-capturing device 110 moves remain unchanged. Assuming that the depth of the first edge characteristic point of the first edge characteristic is different from the depth of the second edge characteristic point of the second edge characteristic (i.e., there is a difference between the depth of the first edge characteristic point and the depth of the second edge characteristic point), the relative positions of the first edge characteristic point and the second edge characteristic point obtained after the image-capturing device 110 moves may change.

Therefore, the first edge characteristic and the second edge characteristic may be obtained by controlling the processing machine 150 to move the image-capturing device 110, and the relative positions of the first edge characteristic point of the first edge characteristic and the second edge characteristic point of the second edge characteristic may be calculated, so as to obtain the depth information corresponding to the first edge characteristic point and the second characteristic point as the depth information of the workpiece 160. Then, the processing device 120 may fit the three-dimensional edge information of the workpiece 160 according to the edge information of the workpiece 160 and the depth information of the workpiece 160.

Figure 2:
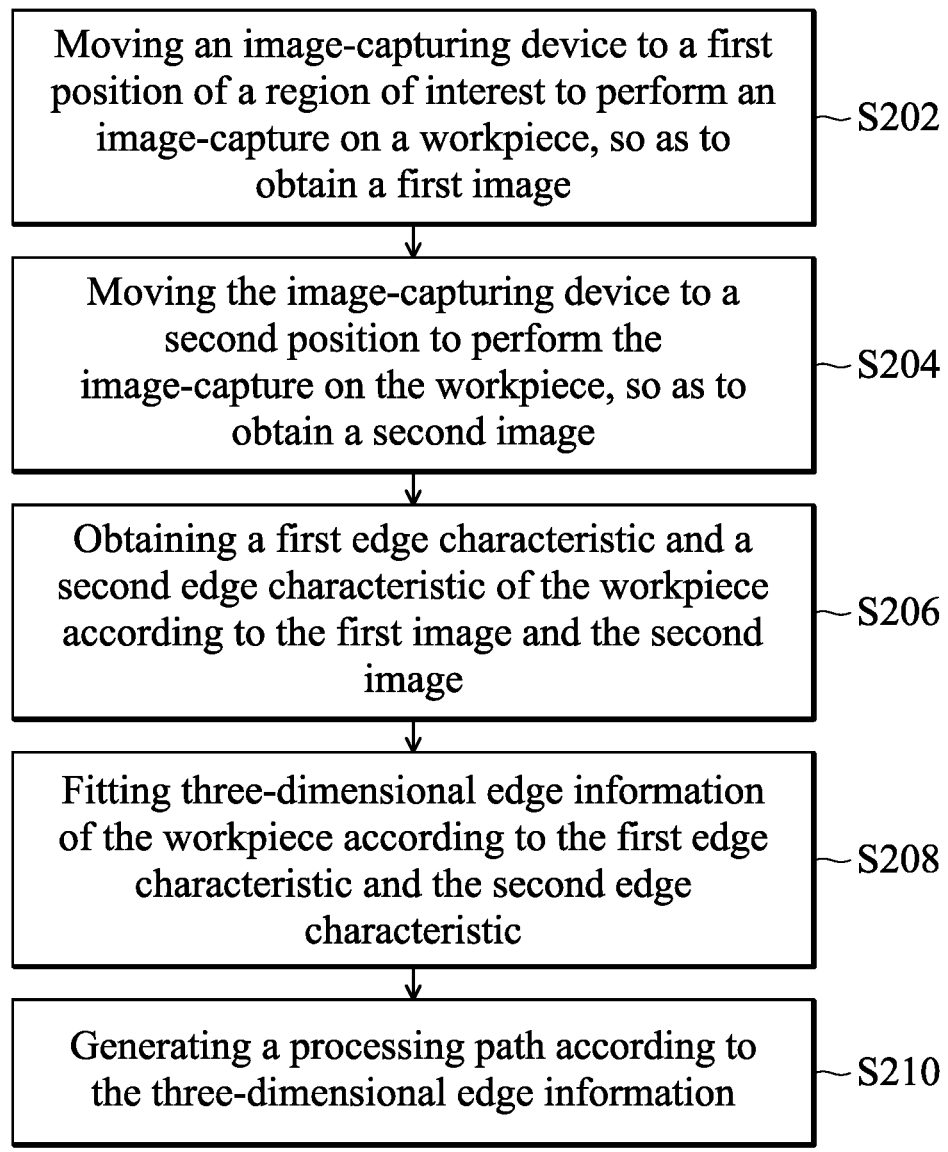
FIG. 2 is a flowchart of a processing path generating method according to an embodiment of the present disclosure.

FIG. 2 is a flowchart of a processing path generating method according to an embodiment of the present disclosure. In step S202, the method involves moving an image-capturing device to a first position of a region of interest to perform an image-capture on a workpiece, so as to obtain a first image. In step S204, the method involves moving the image-capturing device to a second position to perform the image-capture on the workpiece, so as to obtain a second image. In step S206, the method involves obtaining a first edge characteristic and a second edge characteristic of the workpiece according to the first image and the second image.

In step S208, the method involves fitting three-dimensional edge information of the workpiece according to the first edge characteristic and the second edge characteristic. In step S210, the method involves generating a processing path according to the three-dimensional edge information. In the embodiment, the region of interest may include a square, a circle, an ellipse, or an irregular polygon, for example.

Figure 3:
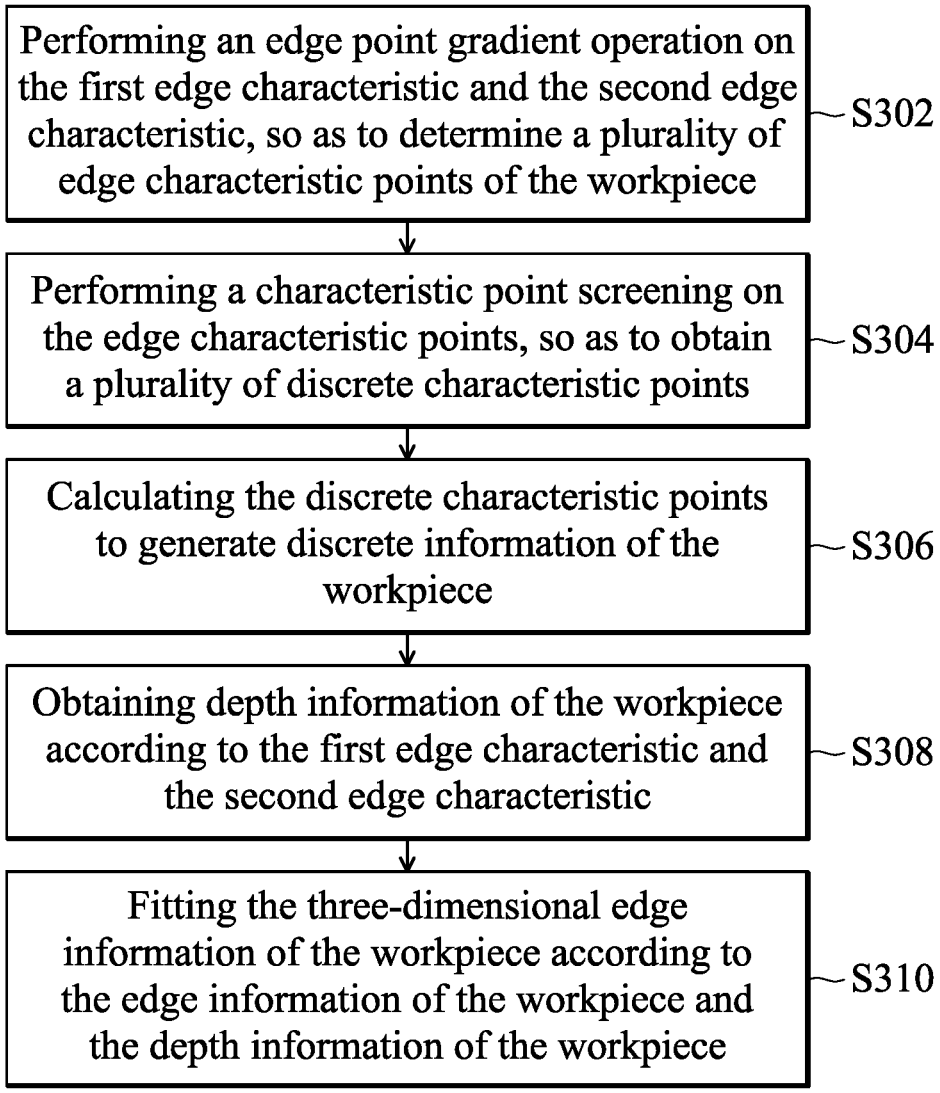
FIG. 3 is a detailed flowchart of step S208 in FIG. 2.

FIG. 3 is a detailed flowchart of step S208 in FIG. 2. In step S302, the method involves performing an edge point gradient operation on the first edge characteristic and the second edge characteristic, so as to determine a plurality of edge characteristic points of the workpiece. In step S304, the method involves performing a characteristic point screening on the edge characteristic points, so as to obtain a plurality of discrete characteristic points. In step S306, the method involves calculating the discrete characteristic points to generate discrete information of the workpiece.

In step S308, the method involves obtaining depth information of the workpiece according to the first edge characteristic and the second edge characteristic. In step S310, the method involves fitting the three-dimensional edge information of the workpiece according to the edge information of the workpiece and the depth information of the workpiece. In the embodiment, step S304 further uses a labeling method to perform the characteristic screening on the edge characteristic points, so as to obtain the discrete characteristic points.

Figure 4A:
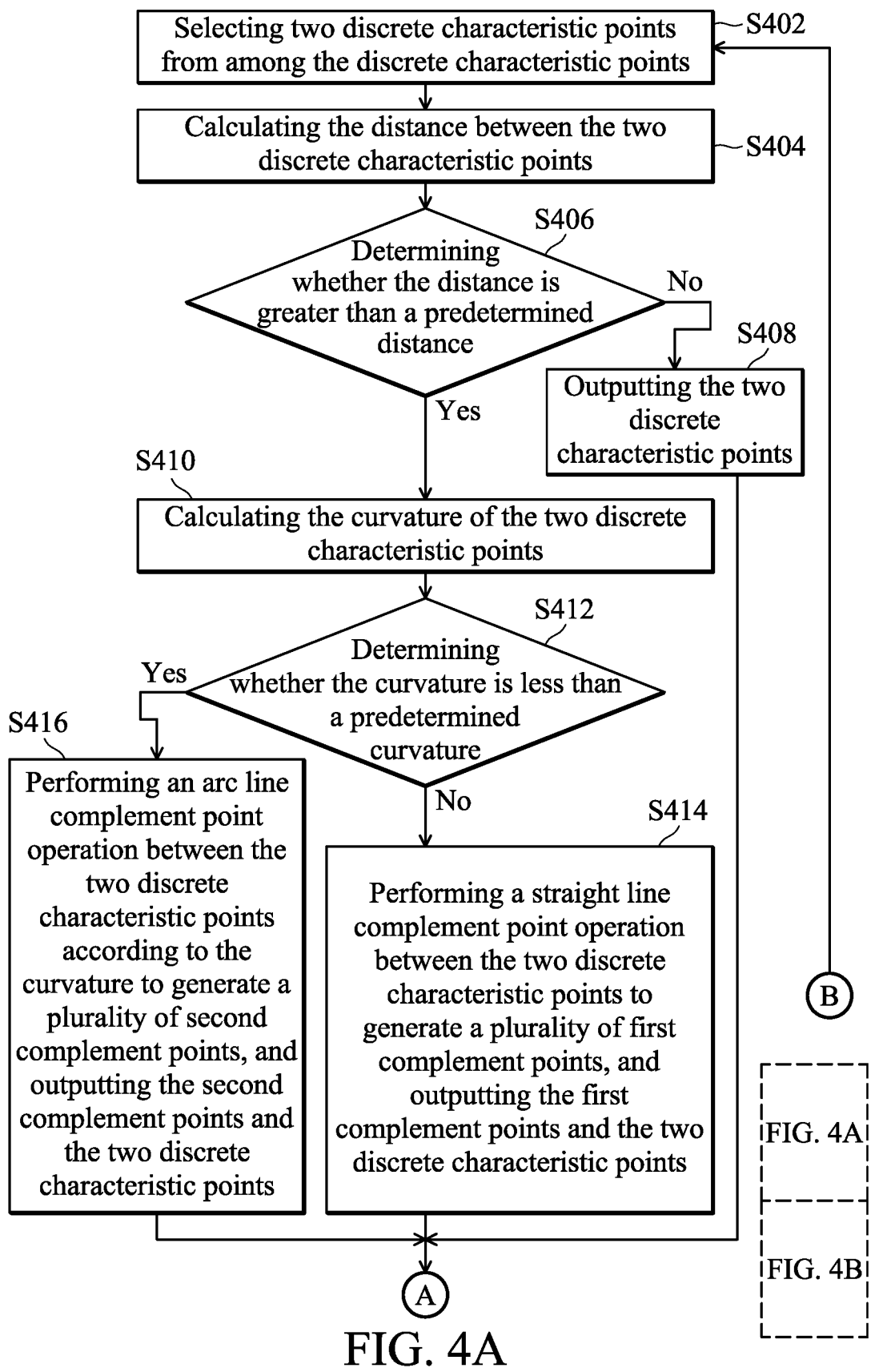
FIGS. 4A and 4B are a detailed flowchart of step S306 in FIG. 3.
Figure 4B:
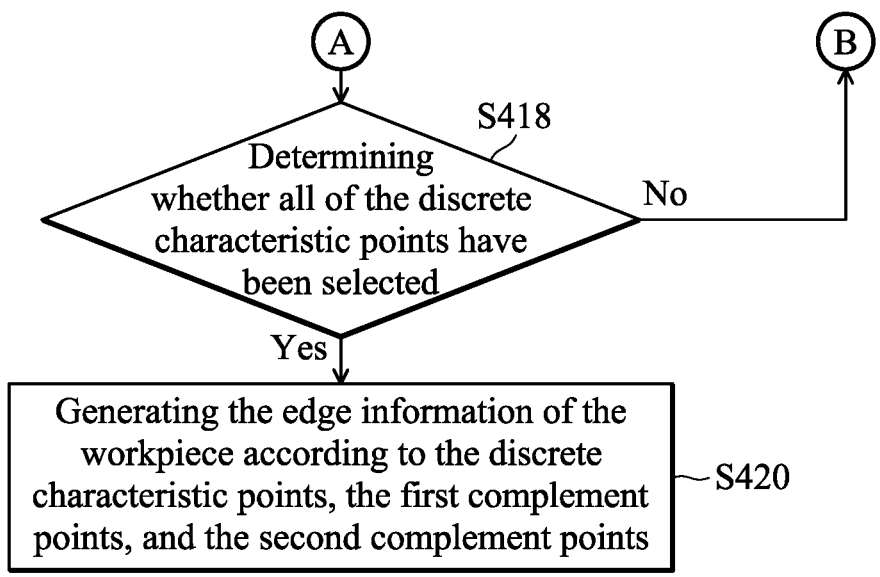

FIGS. 4A and 4B are a detailed flowchart of step S306 in FIG. 3. In step S402, the method involves selecting two discrete characteristic points from among the discrete characteristic points. In step S404, the method involves calculating the distance between the two discrete characteristic points. In step S406, the method involves determining whether the distance is greater than a predetermined distance. When it is determined that the distance is not greater than the predetermined distance, the method proceeds to step S408. In step S408, the method involves outputting the two discrete characteristic points.

When it is determined that the distance is greater than the predetermined distance, the method proceeds to step S410. In step S410, the method involves calculating the curvature of the two discrete characteristic points. In step S412, the method involves determining whether the curvature is less than a predetermined curvature. When it is determined that the curvature is not less than the predetermined curvature, the method proceeds to step S414. In step S414, the method involves performing a straight line complement point operation between the two discrete characteristic points to generate a plurality of first complement points, and outputting the first complement points and the two discrete characteristic points.

When it is determined that the curvature is less than the predetermined curvature, the method proceeds to step S416. In step S416, the method involves performing an arc line complement point operation between the two discrete characteristic points according to the curvature to generate a plurality of second complement points, and outputting the second complement points and the two discrete characteristic points. In step S418, the method involves determining whether all of the discrete characteristic points have been selected.

When it is determined that all of the discrete characteristic points have not been selected, the method returns to step S402, and the process of selecting two discrete characteristic points from among the discrete characteristic points is performed again. That is, two new discrete characteristic points are selected, and the subsequent steps S404~S18 are performed until it is determined that all of the discrete characteristic points have been selected. When it is determined that all of the discrete characteristic points have been selected, the method proceeds to step S420. In step S420, the method involves generating the edge information of the workpiece according to the discrete characteristic points, the first complement points, and the second complement points.

It should be noted that the order in which the steps illustrated in FIG. 2, FIG. 3, and FIGS. 4A and 4B are performed is only for illustrative purposes, and is not intended to limit the order of the steps in the present disclosure. The user may change the order of the steps above in order to meet requirements. The flowcharts described above may add additional steps or use fewer steps without departing from the spirit and scope of the present disclosure.

In summary, according to the processing path generating method and device disclosed by the embodiments of the present disclosure, the image-capturing device is moved to the first position of the region of interest to perform the image-capture on the workpiece, so as to obtain the first image and the image-capturing device is moved to the second position to perform the image-capture on the workpiece, so as to obtain the second image. The first edge characteristic and the second edge characteristic of the workpiece are obtained according to the first image and the second image. The three-dimensional edge information of the workpiece is fitted according to the first edge characteristic and the second edge characteristic. The processing path is generated according to the three-dimensional edge information. Therefore, the edge processing path of the workpiece may be effectively generated, so as to improve the flexibility of machine processing and increase the convenience of use.

While the present disclosure has been described by way of example and in terms of the embodiments, it should be understood that the present disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processing path generating method, comprising:
    moving an image-capturing device to a first position of a region of interest to perform an image-capture on a workpiece, so as to obtain a first image;
    moving the image-capturing device to a second position to perform the image-capture on the workpiece, so as to obtain a second image;
    obtaining a first edge characteristic and a second edge characteristic of the workpiece according to the first image and the second image;
    fitting three-dimensional edge information of the workpiece according to the first edge characteristic and the second edge characteristic; and
    generating a processing path according to the three-dimensional edge information;
    wherein the step of fitting three-dimensional edge information of the workpiece according to the first edge characteristic and the second edge characteristic comprises:
    performing an edge point gradient operation on the first edge characteristic and the second edge characteristic, so as to determine a plurality of edge characteristic points of the workpiece;
    performing a characteristic point screening on the plurality of edge characteristic points, so as to obtain a plurality of discrete characteristic points;
    calculating the plurality of discrete characteristic points to generate discrete information of the workpiece;
    obtaining depth information of the workpiece according to the first edge characteristic and the second edge characteristic; and
    fitting the three-dimensional edge information of the workpiece according to the edge information of the workpiece and the depth information of the workpiece.

2. The processing path generating method as claimed in claim 1, wherein the region of interest comprises a square, a circle, an ellipse, or an irregular polygon.

3. The processing path generating method as claimed in claim 1, wherein a labeling method is used to perform the characteristic screening on the plurality of edge characteristic points, so as to obtain the plurality of discrete characteristic points.

4. The processing path generating method as claimed in claim 1, wherein the step of calculating the plurality of discrete characteristic points to generate the discrete information of the workpiece comprises:
    selecting two discrete characteristic points from among the plurality of discrete characteristic points;
    calculating a distance between the two discrete characteristic points;
    determining whether the distance is greater than a predetermined distance;
    outputting the two discrete characteristic points when it is determined that the distance is not greater than the predetermined distance;
    calculating a curvature of the two discrete characteristic points when it is determined that the distance is greater than the predetermined distance;
    determining whether the curvature is less than a predetermined curvature;

performing a straight line complement point operation between the two discrete characteristic points to generate a plurality of first complement points, and outputting the plurality of first complement points and the two discrete characteristic points when it is determined that the curvature is not less than the predetermined curvature;

performing an arc line complement point operation between the two discrete characteristic points according to the curvature to generate a plurality of second complement points, and outputting the plurality of second complement points and the two discrete characteristic points when it is determined that the curvature is less than the predetermined curvature;

determining whether all of the discrete characteristic points have been selected;

returning to the step of selecting the two discrete characteristic points from among the plurality of discrete characteristic points when it is determined that all of the discrete characteristic points have not been selected; and generating the edge information of the workpiece according to the plurality of discrete characteristic points, the plurality of first complement points and the plurality of second complement points when it is determined that all of the discrete characteristic points have been selected.

5. A processing path generating device, comprising:
an image-capturing device, disposed on a processing machine; and
a processing device, configured to control the processing machine to move the image-capturing device to a first position of a region of interest to perform an image-capture on a workpiece, so as to obtain a first image, and to move the image-capturing device to a second position to perform the image-capture on the workpiece, so as to obtain a second image, wherein the processing device obtains a first edge characteristic and a second edge characteristic of the workpiece according to the first image and the second image, fits three-dimensional edge information of the workpiece according to the first edge characteristic and the second edge characteristic, and generates a processing path according to the three-dimensional edge information;
wherein the processing device performs an edge point gradient operation on the first edge characteristic and the second edge characteristic, so as to determine a plurality of edge characteristic points of the workpiece, the processing device performs a characteristic point screening on the plurality of edge characteristic points, so as to obtain a plurality of discrete characteristic points, the processing device calculates the plurality of discrete characteristic points to generate discrete information of the workpiece, the processing device obtains depth information of the workpiece according to the first edge characteristic and the second edge characteristic, and the processing device fits the three-dimensional edge information of the workpiece according to the edge information of the workpiece and the depth information of the workpiece.

6. The processing path generating device as claimed in claim 5, wherein the region of interest comprises a square, a circle, an ellipse, or an irregular polygon.

7. The processing path generating device as claimed in claim 5, wherein the processing device uses a labeling method to perform the characteristic screening on the plurality of edge characteristic points, so as to obtain the plurality of discrete characteristic points.

8. The processing path generating device as claimed in claim 5, wherein the processing device selects two discrete characteristic points from among the plurality of discrete characteristic points; the processing device calculates a distance between the two discrete characteristic points; the processing device determines whether the distance is greater than a predetermined distance; the processing device outputs the two discrete characteristic points when it is determined that the distance is not greater than the predetermined distance; the processing device calculates a curvature of the two discrete characteristic points when it is determined that the distance is greater than the predetermined distance; the processing device determines whether the curvature is less than a predetermined curvature; the processing device performs a straight line complement point operation between the two discrete characteristic points to generate a plurality of first complement points, and outputs the plurality of first complement points and the two discrete characteristic points when it is determined that the curvature is not less than the predetermined curvature; the processing device performs an arc line complement point operation between the two discrete characteristic points according to the curvature to generate a plurality of second complement points, and outputs the plurality of second complement points and the two discrete characteristic points when it is determined that the curvature is less than the predetermined curvature; the processing device determines whether all of the discrete characteristic points have been selected; the processing device continues to select the two discrete characteristic points from among the plurality of discrete characteristic points when it is determined that all of the discrete characteristic points have not been selected; and the processing device generates the edge information of the workpiece according to the plurality of discrete characteristic points, the plurality of first complement points and the plurality of second complement points when it is determined that all of the discrete characteristic points have been selected.

* * * * *